(12) United States Patent
Batson et al.

(10) Patent No.: US 8,740,251 B2
(45) Date of Patent: Jun. 3, 2014

(54) GROUND SUPPORT SERVICE CART APPARATUS AND METHODS

(75) Inventors: Nathan S. Batson, Colbert, WA (US); Silas E. Carroll, IV, Newport, WA (US); Steve W. Santjer, Airway Heights, WA (US)

(73) Assignee: Spokane Industries, Inc., Spokane, WA (US)

(*) Notice: Subject to any disclaimer, the term of this patent is extended or adjusted under 35 U.S.C. 154(b) by 824 days.

(21) Appl. No.: 12/552,867

(22) Filed: Sep. 2, 2009

(65) Prior Publication Data

US 2011/0048572 A1 Mar. 3, 2011

(51) Int. Cl.
*B60P 3/22* (2006.01)
*B65B 37/00* (2006.01)
*B67C 3/00* (2006.01)

(52) U.S. Cl.
USPC .. 280/839; 141/231; 137/355.16; 137/355.19

(58) Field of Classification Search
USPC ......... 141/231; 280/839; 137/355.12, 355.16, 137/355.19
See application file for complete search history.

(56) References Cited

U.S. PATENT DOCUMENTS

| | | | | |
|---|---|---|---|---|
| 2,498,229 A | * | 2/1950 | Adler | 141/26 |
| 2,765,938 A | * | 10/1956 | Di Addezio | 410/24.1 |
| 3,810,487 A | * | 5/1974 | Cable et al. | 137/351 |
| 4,911,330 A | * | 3/1990 | Vlaanderen et al. | 222/132 |
| 4,981,272 A | * | 1/1991 | Cutore | 244/135 A |
| 5,135,258 A | * | 8/1992 | Buxton | 280/839 |
| 5,873,498 A | * | 2/1999 | Moore et al. | 222/181.2 |
| 6,860,300 B1 | * | 3/2005 | Kuntz | 141/65 |
| 7,293,802 B2 | * | 11/2007 | Bachman et al. | 280/839 |
| 7,308,918 B1 | | 12/2007 | Brakefield | |
| 2005/0111948 A1 | * | 5/2005 | Nolasco et al. | 414/563 |

* cited by examiner

*Primary Examiner* — Timothy L Maust
*Assistant Examiner* — Brandon J Warner
(74) *Attorney, Agent, or Firm* — Holland & Hart (57) ABSTRACT

An equipment service apparatus, which is suited for use in servicing ground support equipment (GSE) or aircraft ground equipment (AGE), includes a plurality of features for use in servicing and maintaining the GSE/AGE where the GSE/AGE is in use servicing an aircraft so that the GSE/AGE is not itself required to be transported to a remote location for servicing and/or maintenance. The apparatus may be constructed as a towable cart. The apparatus may include a fuel tank, a pump system configured to add fuel to or remove fuel from the fuel tank, and a fuel valve assembly operable to control fuel flow into and out of the fuel tank. The apparatus may also include a container storage portion configured to retain a plurality of removable fluid storage containers, at least one power source, and a power control system operable to control power from the at least one power source to operate at least some features of the equipment service apparatus.

15 Claims, 10 Drawing Sheets

GROUND SUPPORT SERVICE CART APPARATUS AND METHODS

TECHNICAL FIELD

The present disclosure relates to equipment service devices such as service carts and service vehicles.

BACKGROUND

Many pieces of maintenance and other types of equipment are typically used to service an aircraft while the aircraft is on the ground. Such aircraft related equipment may include, for example, conditioning, maintaining, powering, lighting, and servicing equipment. These pieces of equipment are commonly referred to as ground support equipment (GSE) or aircraft ground equipment (AGE). GSE may include AGE. GSE may be used to service other types of equipment besides aircraft. For example, in a military setting some equipment serviced by GSE includes HUMMERS® (high mobility multipurpose wheeled vehicle), tanks, and trucks. In the commercial airline industry, other types of equipment may be serviced by GSE.

GSE and AGE in military settings are typically powered by diesel engines that utilize reclaimed jet fuel such as JP8 fuel. Many types of GSE and AGE are configured as carts or trailers that are towed into place using a powered vehicle such as a bobtail or tug type vehicle.

GSE and AGE are typically operating 24 hours a day, 7 days per week around every aircraft that is on the ground between flights or other equipment that is intended to be in use (i.e., operating in the field during a military operation). GSE and AGE include, for example, power units, heating units, air conditioning units, nitrogen generators, lighting units, low pacs (low pressure air compressors), and other devices. Some of these pieces of equipment require fuel and servicing as often as every 1 to 2 hours, while other types of equipment require maintenance and servicing only a few times per day.

GSE and AGE are usually fueled and serviced by hooking up the GSE/AGE to a bobtail or tug, delivering the GSE/AGE to a fueling and/or service area remote from the aircraft or other equipment being serviced ("the equipment"), and then returning the GSE/AGE back to the equipment at a later time. During the time in which the GSE/AGE is being serviced and fueled at the remote location, a separate GSE/AGE may be delivered and put in use in its place at the equipment to ensure that the equipment receives the needed services at all times. The remote location where the GSE/AGE is serviced and fueled may be a hanger or other designated area that can be as far away as, for example, two or more miles from the location of the equipment. As such, significant amounts of time, man power, and fuel are needed to transport the GSE/AGE to and from the fueling and service areas.

In military applications, it is common for squadrons or "packages" of the equipment to be deployed. Typically, the GSE/AGE for the equipment are deployed with these squadrons. In order to transport the GSE/AGE to the deployed location, the GSE/AGE must receive special services to prepare them for transport. These special services often require towing of the GSE/AGE to a remote service hanger or other location where the services are conducted. These services are often time consuming and labor intensive, and may pose environmentally hazardous conditions due to the special nature of the servicing, such as defueling.

A need exists to address these and other issues related to servicing GSE/AGE.

SUMMARY

One aspect of the present disclosure relates to an equipment service apparatus that includes a support frame, at least two axles mounted to the support frame, and at least one pair of wheels mounted to each axle. The apparatus includes a fuel tank mounted to the support frame, a pump system configured to add fuel to and remove fuel from the fuel tank, and a fuel valve assembly operable to control fuel flow into and out of the fuel tank. The apparatus may also include a container storage portion configured to retain a plurality of removable fluid storage containers, at least one power source, and a power control system operable to control power from the at least one power source to operate at least some features of the equipment service apparatus.

In some arrangements, the fuel valve assembly may be operable to either permit fuel flow into or permit fuel flow out of the fuel tank at a given time. The pump system may include at least one fuel filter member. The container storage portion may be configured to retain at least one removable storage container comprising one of motor oil, hydraulic oil, and engine coolant. The one power source may include a rechargeable battery. The apparatus may further include a lighting system comprising at least one light member arranged to illuminate portions of the equipment service apparatus. The apparatus may further include a tow bar connected at one end of the support frame, wherein the tow bar is adjustable from an lowered operating position and raised rest position.

The apparatus may further include a brake system operable to apply a brake force to at least one of the pairs of wheels. The apparatus may also include a fuel dispensing assembly that includes a spooled hose and a nozzle, wherein the spool dispensing assembly is connected in flow communication with the fuel valve assembly. The apparatus may include a spill containment kit and a source of fire suppressant. The apparatus may also include a source of compressed air and a compressed air dispenser connected in flow communication with the source of compressed air. The source of compressed air may include an air compressor and a compressed air storage tank.

Another aspect of the present disclosure relates to a portable fueling and equipment service apparatus. The apparatus includes a fuel tank positioned at a front end of the apparatus, a fuel dispenser positioned at a rear end of the apparatus, and a fuel reclaiming assembly positioned at the rear end of the apparatus. The apparatus may further include DC power supply positioned at the rear end of the apparatus, at least one control member operable to control the fuel dispenser, fuel reclaiming assembly, and DC power supply positioned at the rear end of the apparatus, and a fluid container storage portion configured to retain at least one removable fluid container and positioned at the rear end of the apparatus.

In some arrangements, the apparatus further includes a fuel pump and a directional valve (e.g., a four-way valve), wherein the four-way value controls a direction of fluid flow from one of the fuel tank to the fuel dispenser or from the fuel reclaiming assembly to the fuel tank. In some arrangements, a reversible pump may be used in place of a directional valve.

A further aspect of the present disclosure relates to a method of servicing at least one aircraft ground equipment (AGE). The method may include providing a portable ground support equipment service cart having a fuel tank configured to retain a supply of fuel, a fuel dispenser, a fuel reclaiming assembly, a fuel pump, a power supply, a container retention portion configured to retain at least one removable fluid container, and a valve assembly. The method may also include operating the valve assembly to control a direction of fuel flow to or from the fuel tank, operating the fuel pump with the power supply to provide dispensing of the supply of fuel from the fuel tank, through the fuel dispenser, and to the at least one AGE, operating the fuel pump to provide removal of fuel from the at least one AGE into the fuel tank with the fuel reclaiming assembly, and supplying fluids from the at least one removable fluid container to the at least one AGE.

The portable ground equipment service cart may further include a source of pressurized air and a pressurized air dispenser, and the method further includes supplying pressurized air to the at least one AGE with the pressurized air dispenser. The portable ground equipment service cart may further include at least one axle, at least one pair of wheels, and a tow bar, the method further includes towing the portable ground equipment service cart to a position adjacent to the at least one AGE. The portable ground equipment service cart may further include a lighting system, and the method further includes illuminating a portion of at least one of the AGE and the portable ground equipment service cart with the lighting system. The portable ground equipment service cart may further include a spill containment kit, the method further comprising using the spill containment kit to contain spilled fluid associated with servicing the at least one AGE. The portable ground equipment service cart may further include a control console operable to control operable of the fuel dispenser and fuel reclaiming assembly, a valve actuator operable to operable the valve assembly, and a power controller operable to control power supplied from the power supply for operation of at least some features of the portable ground equipment service cart.

Other objects, features, and advantages of the invention will become apparent from the following detailed description of the invention with reference to the accompanying drawings.

DETAILED DESCRIPTION

The present disclosure is directed to mobile ground support service devices and methods. One type of ground support service device is sometimes referred to as ground service equipment (GSE), aircraft ground equipment (AGE) service carts, or portable ground support equipment service carts. Generally, the present disclosure is directed to equipment service carts, equipment service apparatuses, and related equipment service methods used in conjunction with GSE and AGE. One application of the present disclosure is directed to methods and apparatuses used to maintain and service GSE/AGE to facilitate keeping the GSE/AGE in use servicing an aircraft or other equipment ("the equipment"), or at least in close proximity to the equipment, while the GSE/AGE itself is being serviced.

At least some of the example equipment service carts disclosed herein provide features and functionality that promote servicing a GSE/AGE without the need to shut down, remove, replace or tow the GSE/AGE to a fueling and/or servicing location that is remote from the equipment. The examples disclosed herein may also provide features and functionality, and related methods, of fueling and defueling a GSE/AGE, and filtering fuel and other liquids associated with a GSE/AGE. The present disclosure is also directed to methods and apparatuses configured to perform other services on the GSE/AGE as part of preparing the GSE/AGE for being deployed or otherwise transported a significant distance. The examples disclosed herein may facilitate servicing of an GSE/AGE at a single location that is typically in close proximity to the equipment being serviced by the GSE/AGE, thereby saving time, manpower, energy and fuel that would otherwise be expended when transporting the GSE/AGE to a remote location for such servicing.

In some applications, the equipment service cart may be used to directly service the equipment. For example, the equipment service cart itself may be constructed and configured to directly service an aircraft or other equipment by providing fueling/defueling, servicing fluids, a power source, and compressed air among many capabilities envisioned for the equipment service cart.

An example equipment service cart disclosed herein may incorporate a support frame carried on at least one axle, having at least one pair of wheels. The support frame may support a fuel tank, fuel dispensing devices, and other equipment used for servicing the GSE/AGE. In one example, the fuel tank is a low profiled, double-walled stainless steel fuel tank having a capacity in the range of about 100 to about 1000 gallons. The fuel tank may have a top fill port, a manway, and a field gauge. An example support frame may be supported on two axles with a steerable undercarriage and a parking brake. The equipment service cart may be constructed as a towed or towable device having a tow bar that can be towed by, for example, a bobtail or other towing vehicle. The equipment service cart may include a power supply such as a battery bank and may have the capability of supplying AC or DC power.

One aspect of the examples disclosed herein relates to the capability of the equipment service cart to provide both fueling and defueling functions using a single, mobile unit. As noted above, GSE/AGE are sometimes transported with the equipment being serviced by the GSE/AGE. One service that is commonly conducted prior to such transporting is the removal of the fuel supply held by the GSE/AGE. Typically, the GSE/AGE is moved to a servicing area remote from the equipment being serviced by the GSE/AGE, where the defueling takes place and the removed fuel is stored in a permanent fuel storage tank. The example equipment service carts disclosed herein make it possible to not only provide a mobile refueling unit for refueling a GSE/AGE at any location, but also to defuel the GSE/AGE at any location. The equipment service carts disclosed herein may also use the fuel collected from defueling one or more GSE/AGE to refuel other GSE/AGE without having to return to a permanent fuel storage tank to obtain additional fuel.

Further, the example equipment service carts disclosed herein may provide a source of filtered fuel for a GSE/AGE whether or not the fuel supply held by the equipment service cart was obtained from a permanent fuel storage tank at a remote location or from the equipment service cart defueling a GSE/AGE. Some of the example equipment service carts may include a filtering system that filters the fuel stored in the equipment service cart at least during the process of refueling a GSE/AGE, and in some cases while defueling the GSE/AGE. In some arrangements, the filtering process may be ongoing whether or not a fueling or defueling process is occurring by circulating fuel stored in the fuel tank of the equipment service cart through one or more filters of the equipment storage cart.

Another aspect of the present disclosure relates to positioning of features on the equipment service cart to provide more efficient, effective use of those features. For example, in at least one example configuration, most, if not all, of the fueling/defueling features of the equipment service cart are positioned along one side near one end of the cart. The fueling/defueling features may include a fueling nozzle, hoses, a defueling wand, a control panel, and metering devices. The operator can stand in one location relative to the equipment service cart and have access to all of the fueling/defueling equipment. In another example, the servicing features of the equipment service cart are positioned along a side opposite the fueling/defueling features and near the same end of the cart. The servicing features may include a source of compressed air, containers of servicing fluids (e.g., coolant, hydraulic fluid, and motor oil), tools, and power supplies. Consolidating the servicing equipment at one location on the equipment service cart may provide efficiencies of time for an operator servicing a GSE/AGE.

Another example related to positioning of features concerns the location of a spill containment kit. Spills may occur when servicing or when fueling/defueling a GSE/AGE while the operator is positioned on either side of the cart. The spill containment kit may be positioned at a convenient location, such as at a rear end of the equipment service cart where the operator can travel to quickly no matter where the operator is located relative to the equipment service cart when a spill occurs. The spill containment kit may be positioned at a height that promotes easy viewing (e.g., eye level) and quick access by the operator.

Other features and functionality possible for an equipment service cart for use in servicing aircraft ground equipment are described herein with reference to the attached figures. Throughout the following detailed description, the same or similar reference numbers may be used to describe the same or similar features across multiple embodiments. The embodiments disclosed with reference to the attached figures are merely exemplary of the many features and combination of features possible.

Referring now to FIGS. 1-7, an example equipment service cart 10 is shown and described. The equipment service cart 10 includes a cart assembly 12 and a service equipment assembly 14. The cart assembly 12 includes a support frame 16, first and second axels 18, 20, and first and second pairs of wheels 22 and 24. A tow bar 26 may be attached at a forward or front end portion 32 of the support frame 16.

A brake assembly 28 includes an actuator 42 positioned at the forward end 32 and cables 44 that extend to at least some of the wheels 22, 24. The brake assembly may be used to apply a braking force to at least one wheel of at least one of the pairs of wheels 22, 24.

Each wheel of the pair of wheels 22, 24 may comprise a two-piece rim and tubed tires to promote easier field maintenance and repair of wheels 22, 24. In some arrangements, at least one spare wheel is mounted on the service cart 10 (e.g., along a bottom side of the support frame 16).

A plurality of tow or lift rings 30 are positioned around the periphery of the equipment service cart 10. The lift rings 30 maybe mounted to, for example, a fuel tank 50 of the service equipment assembly 14. At least portions of the service equipment assembly 14 are positioned at a rear portion 34 of the support frame 16.

The tow bar 26 may be mounted with a hinge connection 40 that permits raising and lowering of the tow bar between an operation state (in a generally horizontal orientation) and a raised state as shown in FIGS. 1-7. The tow bar 26 may have a length in the range of about, for example, 40 inches to about 100 inches, and more preferably in the range of about 60 inches to about 80 inches. A tow bar safety lock 126 may be used in conjunction with the hinge connection 40. The tow bar safety lock 126 may be manually between locked and unlocked states. In the locked state, the two bar safety lock 126 may retain the tow bar 26 is the raised state.

The tow bar 26 may be removable from the cart assembly 12 during, for example, air transport of the service cart 10. A disconnected tow bar 26 may be temporarily mounted to the support frame 16 or fuel tank 50. In one example (see broken line version of tow bar 26 in FIG. 3), the tow bar 26 is mounted to a side surface of the fuel tank 50.

A step feature 36 may extend from the support frame 16. The step 36 may be positioned at a location between the front and rear axles 18, 20. The step feature 36 may be useful in helping elevate an operator to the level of a top side of the fuel tank 50 for access to features along the top side of the fuel tank 50. In some arrangements, the step feature 36 may be used as a mounting surfaces for supporting goods, supplies, or equipment used in conjunction with the service cart 10. In at least one example, at least one power source such as a battery, generator, or motor may be positioned on the step feature 36. In other arrangements, wheel chocks, cones, and other ancillary devices may be stored on the step feature 36.

The service cart 10 may have different shapes and sizes. In at least one example, the service cart 10 has a greater length than width. In some arrangements, the first and second axles 18, 20 are shift toward the forward portion 32. In one example, an axel length $L_A$ defined between the first and second axels 18, 20 may be in the range of, for example, about 60 inches to about 100 inches, and more preferably in the range of about 75 inches to about 85 inches. A maximum wheel base width $W_M$ measured between outermost edges of the wheels of each pair of wheels 22, 24 may be in the range of, for example, about 50 inches to about 90 inches, and more preferably in the range of about 70 inches to about 80 inches. The step 36 may be arranged at a height $H_S$ of, for example, about 6 inches to about 20 inches, more preferably in the range of about 8 inches to about 15 inches. A total length L of the equipment service cart 10, which may be defined by a length of the support frame 16, may be in the range of, for example, about 100 inches to about 200 inches, more preferably in the range of about 150 to about 170 inches.

The support frame 16 may comprise two parallel beams as shown in FIGS. 1-7. Alternatively, the support frame 16 may include a single beam or three or more beams. Other constructions for the support frame 16 are possible that provide similar support for the service equipment assembly 14. A rear end of the support frame 16 may include a rear loading feature 37 (see FIGS. 1 and 2). The rear loading feature 37 may include a slanted or sloped cut along a rear surface of the support frame 16 that promotes easier loading of the service cart 10 onto, for example, an air transport when moving the service cart 10 in a rear direction.

The cart assembly 12 may be constructed as a powered vehicle rather than a towed vehicle. In at least one example, the service cart 10 includes a combustion engine, electric motor, or hybrid power source arranged to move the service cart.

The service equipment assembly 14 may include a fuel tank 50, a pump assembly 52, a valve assembly 54 and a filter 56. Fuel tank 50 may include a fill or vent port 84, a level gauge 86, and a manway 88. The vent port 84, level gauge 86 and manway 88 may be accessible along a top side of the fuel tank 50. The top side of the fuel tank 50 may be more easily accessible when an operator is standing on the step 36.

The vent port 84 may also be configured as a fill point for filling the fuel tank 50. The vent port 84 may additional include a down tube 85 (see FIG. 2) that directs incoming fuel toward a bottom portion of the fuel tank 50. In one example, the down tube 85 is arranged at an angle relative to a vertical plane to limit "free-fall" of fuel in the fuel tank 50.

The fuel tank 50 may include other features, gauges, and access openings an any location on the fuel tank. For example, a sump connection assembly or valve 90 may be positioned along a bottom side of the fuel tank 50. The sump connection assembly 90 may be useful for draining fuel from the fuel tank 50. The sump connection assembly 90 may be connected along, for example, a side or rear surface of the fuel tank 50. The sump connection assembly 90 may be coupled in flow communication with other features of the service equipment assembly 14, such as the pump assembly 52, fuel dispenser assembly 58, and fuel reclaiming assembly 60. The sump connection assembly 90 may comprise bottom fill capabilities for filling the fuel tank 50 along a bottom side of the fuel tank 50. In other arrangements, the sump connection assembly 90 may constructed solely for removing (i.e., draining) fluids from the fuel tank 50.

The fuel tank 50 may be oriented at a slight angle relative to a horizontal plane. The sump connection assembly 90 may be positioned at a lowest most point along a bottom side of the fuel tank 50 so that any water or sediment in the fuel tank 50 can be more easily removed through the sump connection assembly 90. In some arrangements, the second or rear axle 20 is positioned vertically closer to fuel tank 50 than the first or front axle 18 to provide a sloped arrangement of the fuel tank 50 relative to a horizontal ground surface. In other arrangements, the fuel tank 50 is mounted to the support frame 16 in a way that provides a sloped arrangement of the fuel tank relative to a horizontal ground surface.

The sump connection assembly 90 may be coupled to a bottom fill inlet/outlet 122. The bottom fill inlet/outlet 122 may be accessible along a rear side of the service cart 10. The bottom fill inlet/outlet 122 may have different connection features and adapters for connection to various fluid inlet or outlet devices. A fill indicator 123 (see FIG. 6) may be positioned adjacent to the bottom fill inlet/outlet 122 to provide a indication of the open/closed state of the and/or other conditions related to the sump connection assembly 90.

Figure 1:
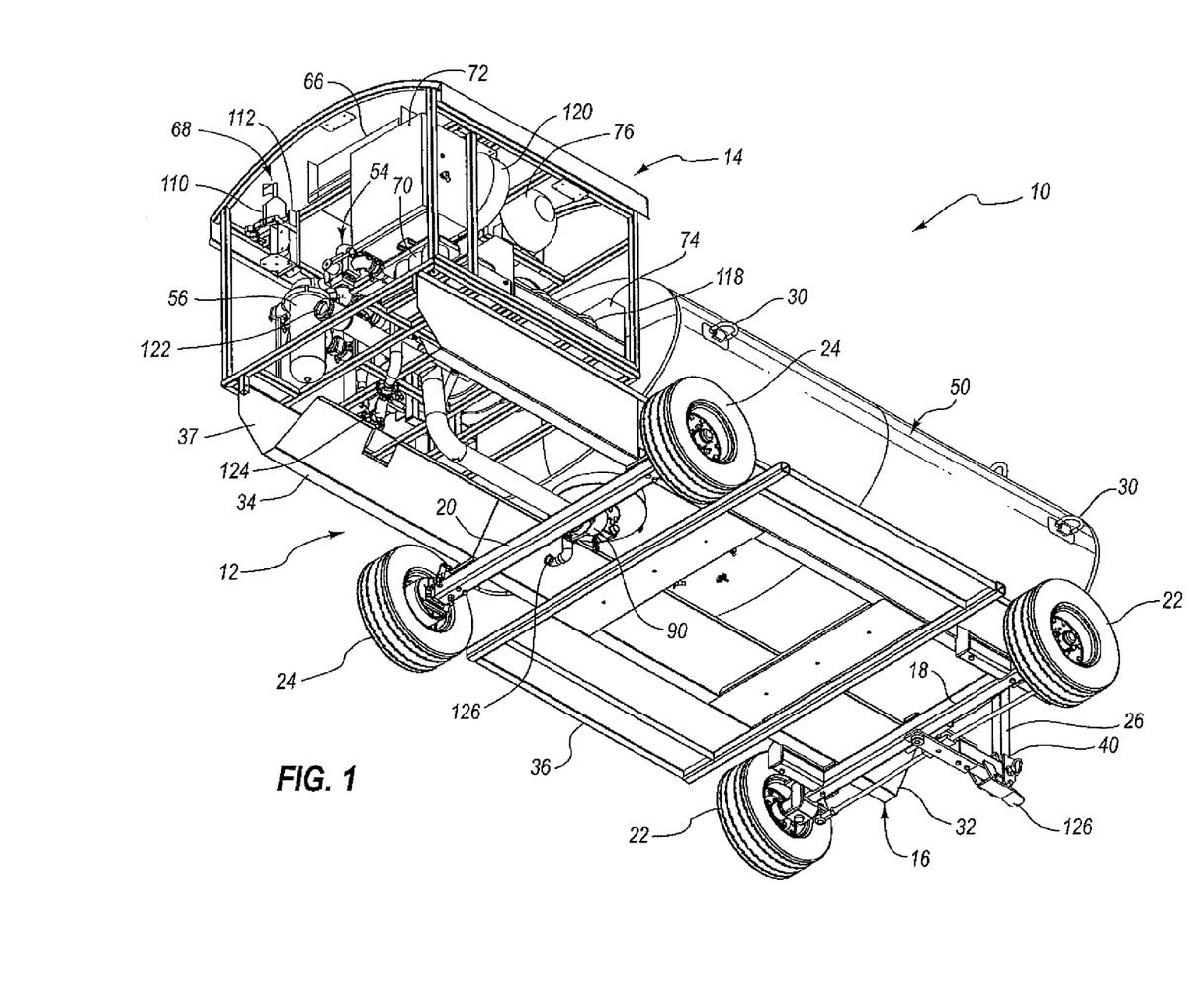
FIG. 1 is a bottom and rear perspective view of an example equipment service cart in accordance with the present disclosure.
Figure 2:
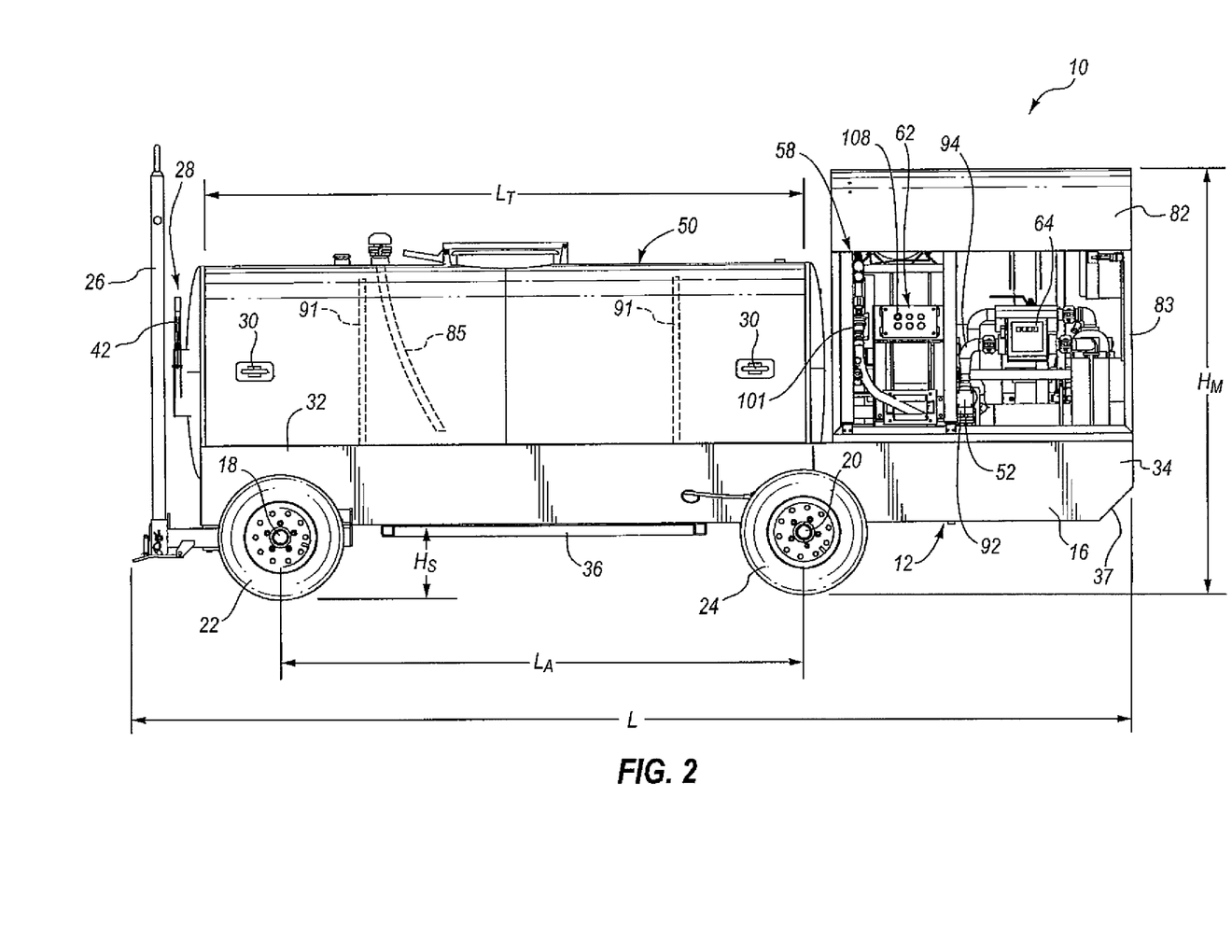
FIG. 2 is a right side view of the equipment service cart shown in FIG. 1.
Figure 3:
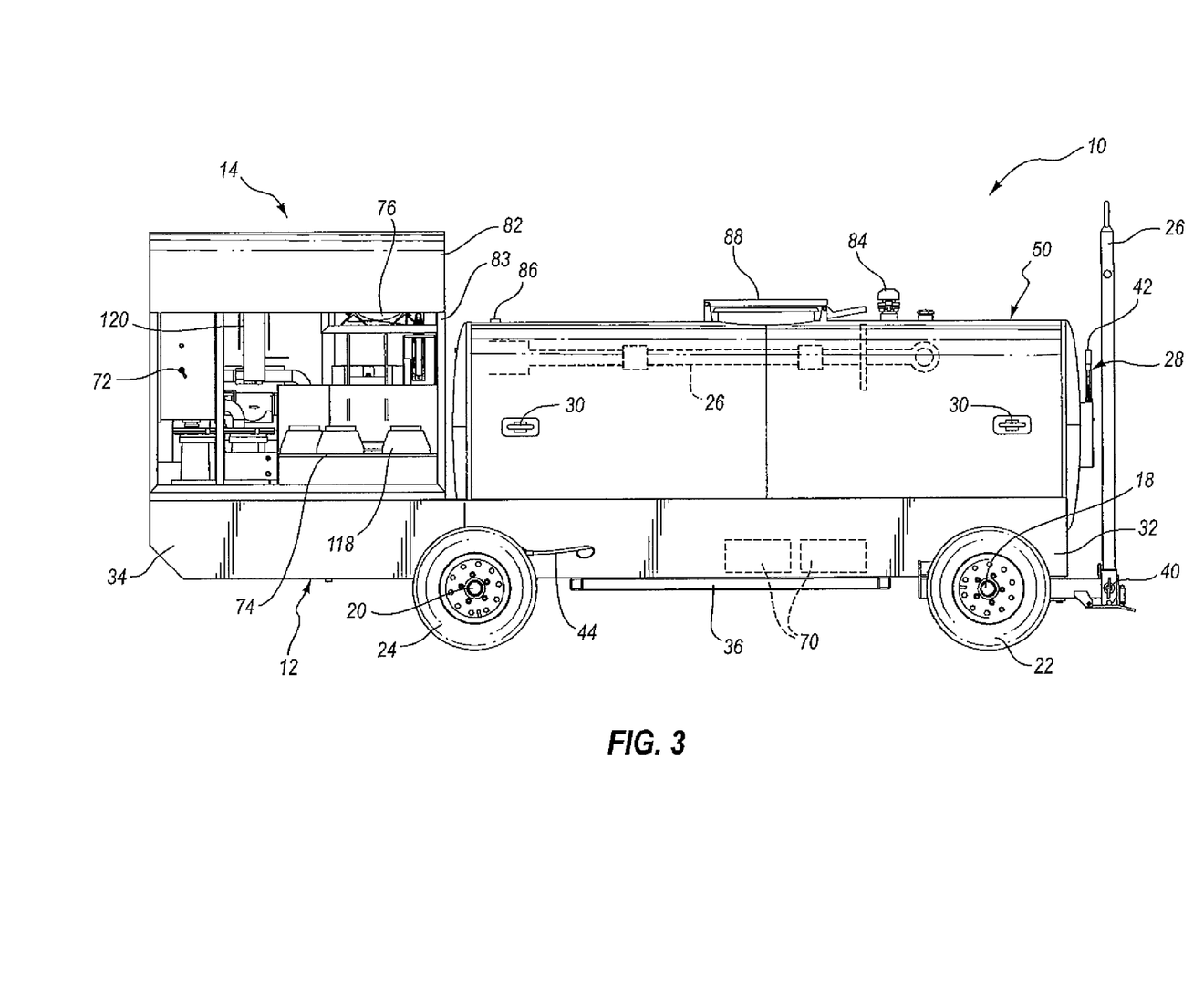
FIG. 3 is a left side view of the equipment service cart shown in FIG. 1.
Figure 4:
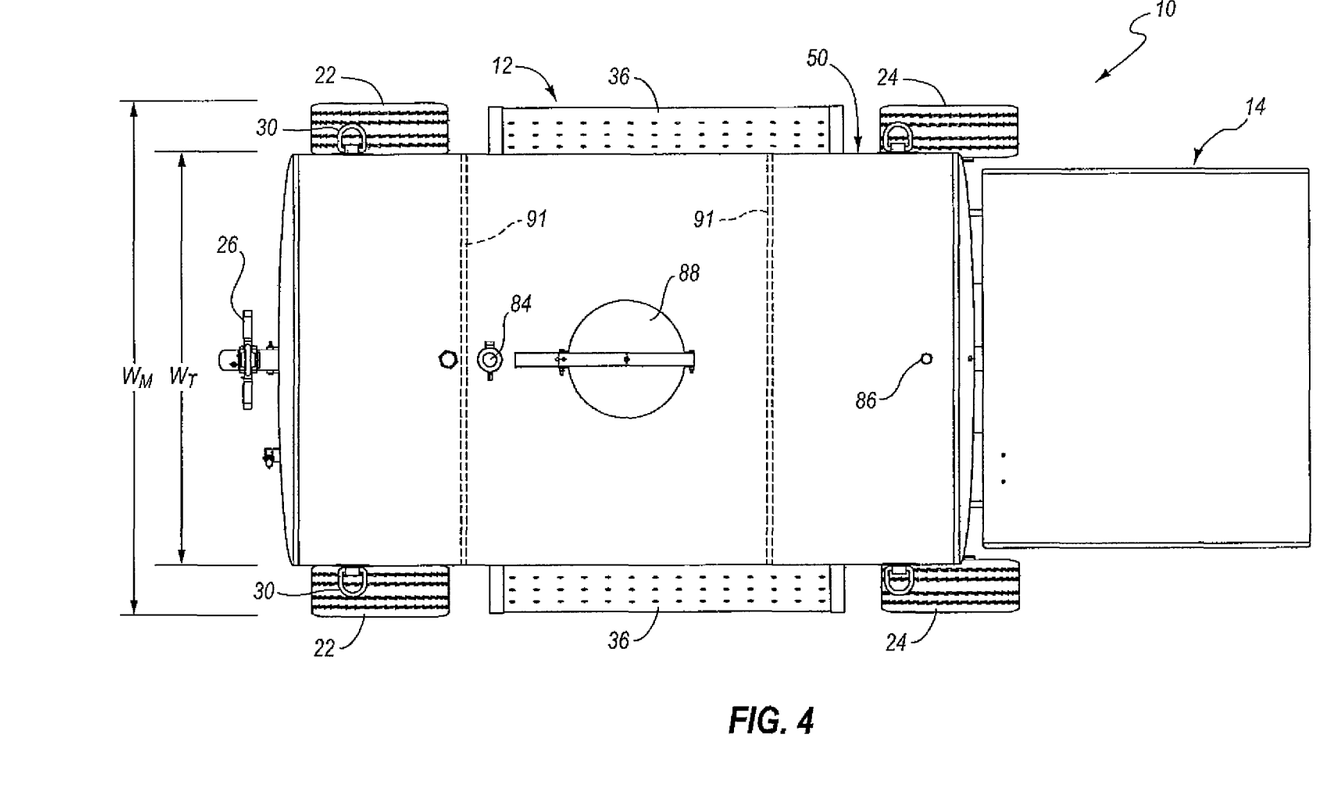
FIG. 4 is a top view of the equipment service cart shown in FIG. 1.
Figure 5:
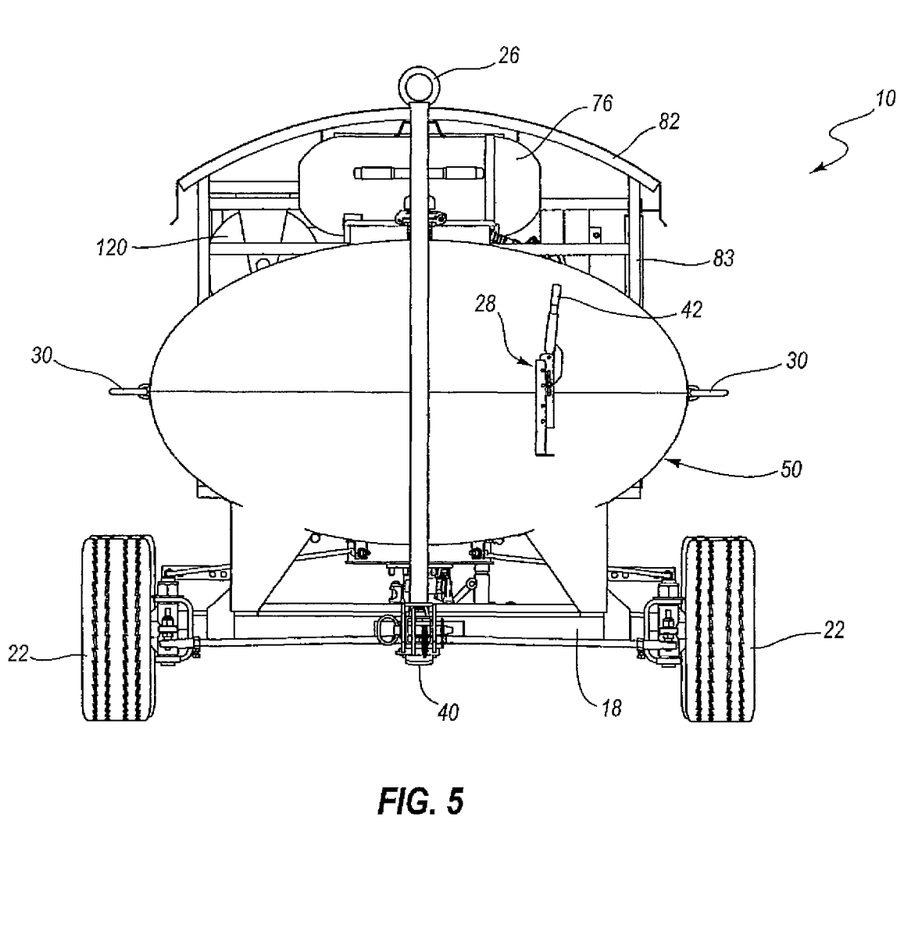
FIG. 5 is a front view of the equipment service cart shown in FIG. 1.
Figure 6:
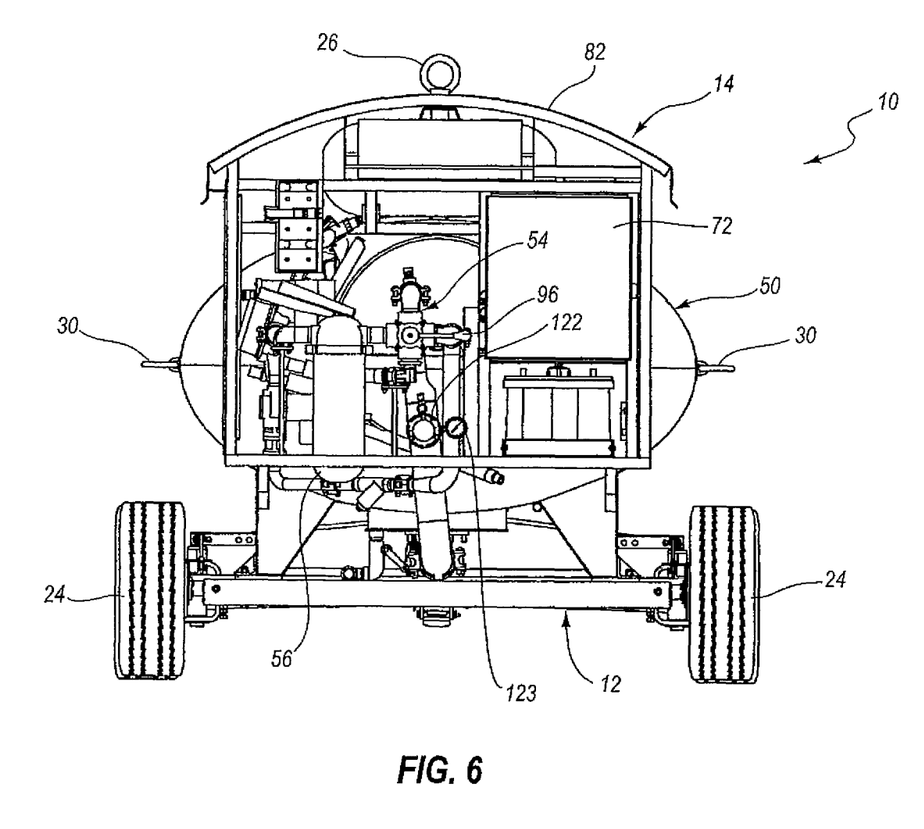
FIG. 6 is a rear view of the equipment service cart shown in FIG. 1.

The fuel tank 50 may include at least one baffle member 91 positioned internally (see FIGS. 2 and 4). The baffle members 91 may help reduce "slush" of the fuel retained in the fuel tank 50 when the service cart 10 is moving. The baffle members 91 may include a plurality of holes. The baffle members 91 may extend from a bottom side to a top side and from opposing side surfaces internally in the fuel tank 50. In some arrangements, the baffle members 91 may have a width and height that is less than a maximum width or maximum height internally of the fuel tank 50.

The service equipment assembly 14 may further include a strainer (e.g., a Y-strainer) 124 or similar feature (e.g., a pump member) positioned in fluid communication with at least one of the fuel lines associated with fuel flow in the service equipment assembly 14. The strainer 124 may operate to collect debris in the fuel and provide a convenient way to drain the fuel lines 94. Straining debris from the fuel prior to the fuel entering the pump 92 can prolong a useful life of the pump 92.

A low point water drain 126 may be positioned in the fuel line adjacent to, for example, the sump connection assembly 90. The low point water drain 126 may be constructed and arranged to remove water from the fuel tank 50 via the sump connection assembly 90. In some arrangements, the low point water drain 126 may be connected in flow communication with the fuel tank 50 separate from the sump connection assembly 90.

Figure 7:
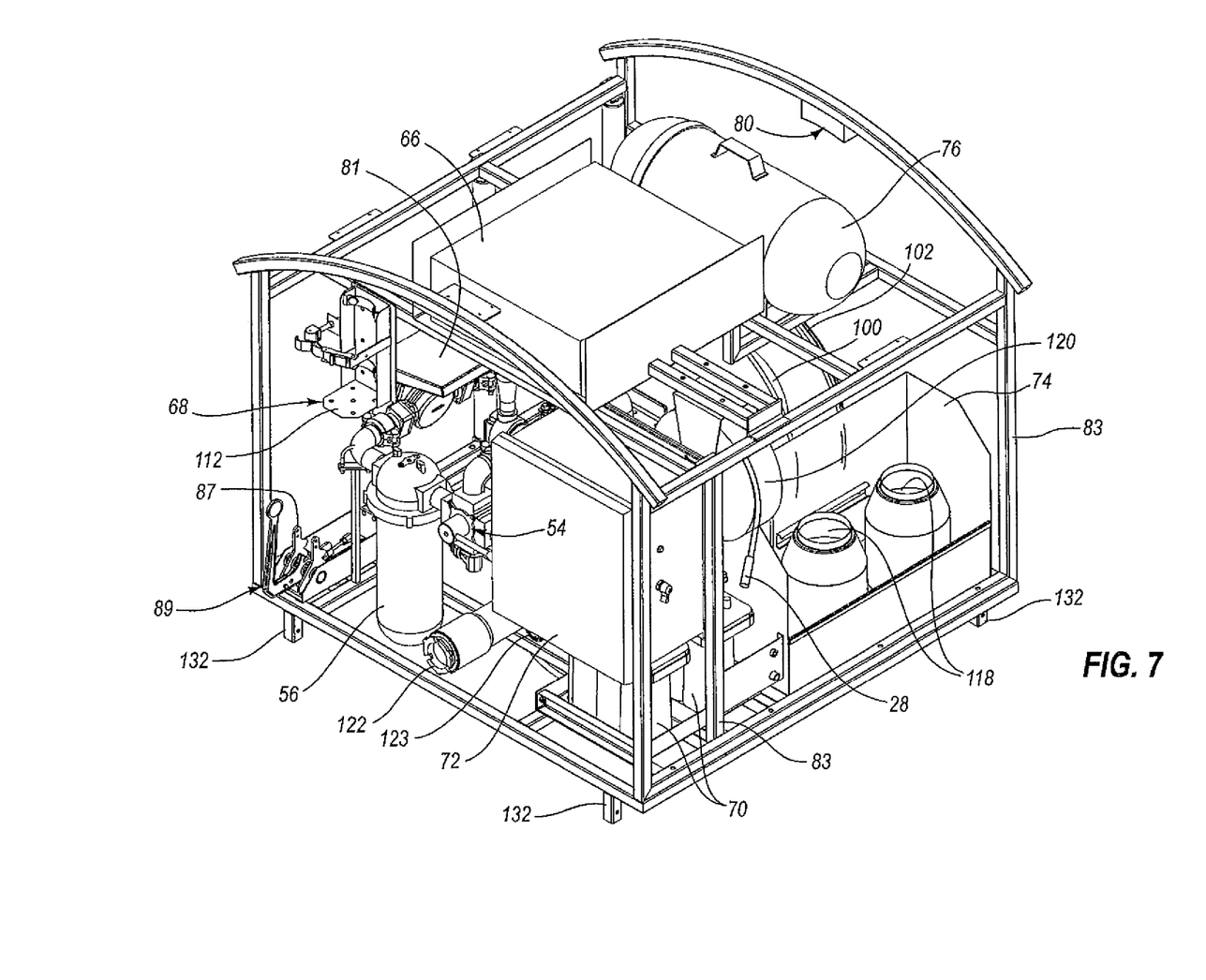
FIG. 7 is a top and rear perspective view of a rear portion of the equipment service cart shown in FIG. 1 with a top cover removed.

The service equipment assembly 14 may optionally include a manual tank valve actuator 89 (see FIG. 7). The manual tank valve actuator 89 may be linked to, for example, a valve associated with the sump connection assembly 90 to open and close access to the fuel tank 50. The manual tank valve actuator 89 may include a remote valve closure feature 87 that is connected to, for example, a cable or other device that provides actuation of the manual tank valve actuator 89 from a different location on the service cart, such as at the forward portion 32. The manual tank valve actuator 89 may include capabilities to automatically close when a fire or smoke condition is detected in the area surrounding the service cart 10.

The fuel tank 50 may have a tank length $L_T$ and a tank width $W_T$. In one example, the tank length $L_T$ is in the range of about 60 inches to about 150 inches, and more preferably in the range of about 80 inches to about 100 inches. The tank width $W_T$ may be in the range of about 40 inches to about 80 inches, and more preferably in the range of about 55 inches to about 65 inches.

The fuel tank 50 has a generally cylindrical construction with an oval cross-sectional shape. The oval cross-sectional shape may help maintain a lower center of gravity for the service cart 10, particularly when the fuel tank 50 is filled with fuel. In other arrangements, the fuel tank 50 may have other cross-sectional shapes such as a circular cross-sectional shape. The fuel tank 50 is shown arranged in a generally horizontal orientation. In other arrangements, the fuel tank 50 may be arranged generally vertically or at an angle relative to a horizontal plane.

The fuel tank 50 may have any of a range of different sizes from, for example, about 50 gallons to about 1500 gallons, and more preferably in the range of about 200 gallons to about 600 gallons.

The pump assembly 52 may include a pump 92 and a plurality of fuel lines 94. The pump 92 may be a reversible pump that control a direction of fluid flow relative to the fuel tank 50. The valve assembly 54 may include an actuator 96 that is an alternative means of controlling a direction of fluid flow relative to the fuel tank 50. For example, In one setting of the valve assembly 54 initiated using the actuator 96, flow may be directed into the fuel tank 50 via, for example, the fuel reclaiming assembly 60. Another valve setting initiated using the actuator 96, the flow direction may be reversed so as to permit flow from the fuel tank 50 through the fuel dispenser assembly 58 to, for example, a GSE or AGE. In at least some arrangements, the pump assembly 52 may be continuously operable to direct the fuel contained within the fuel tank 50 through the filter 56. In other arrangements, the pump assembly 52 is operable to pass fuel through the filter 56 only when draw fuel into the fuel tank 50 via, for example, the fuel reclaiming assembly or dispense fuel from the fuel tank 50 via, for example, the fuel dispenser assembly 58 (i.e., only when dispensing or reclaiming fuel).

The filter 56 may include water absorption capabilities. The filter 56 may be constructed as a filter device, separator device, or have both filtering and separating capabilities. The filter 56 may employ various filtering materials. Multiple filters 56 may be used to filter the fuel handled by service cart 10. Additional filter members may be used to filter other fluids handled by the service cart 10.

The pump assembly 52 may include a lock out device that limits operating the discharge/dispensing of fuel while a reclaiming device is attached, or limiting operating the reclaiming of fuel while a discharge/dispensing device is attached. The lock out device may be mechanical or electrical. The lock out may be integrated into one or both of dispenser assembly 58 and reclaiming assembly 60.

Figure 8:
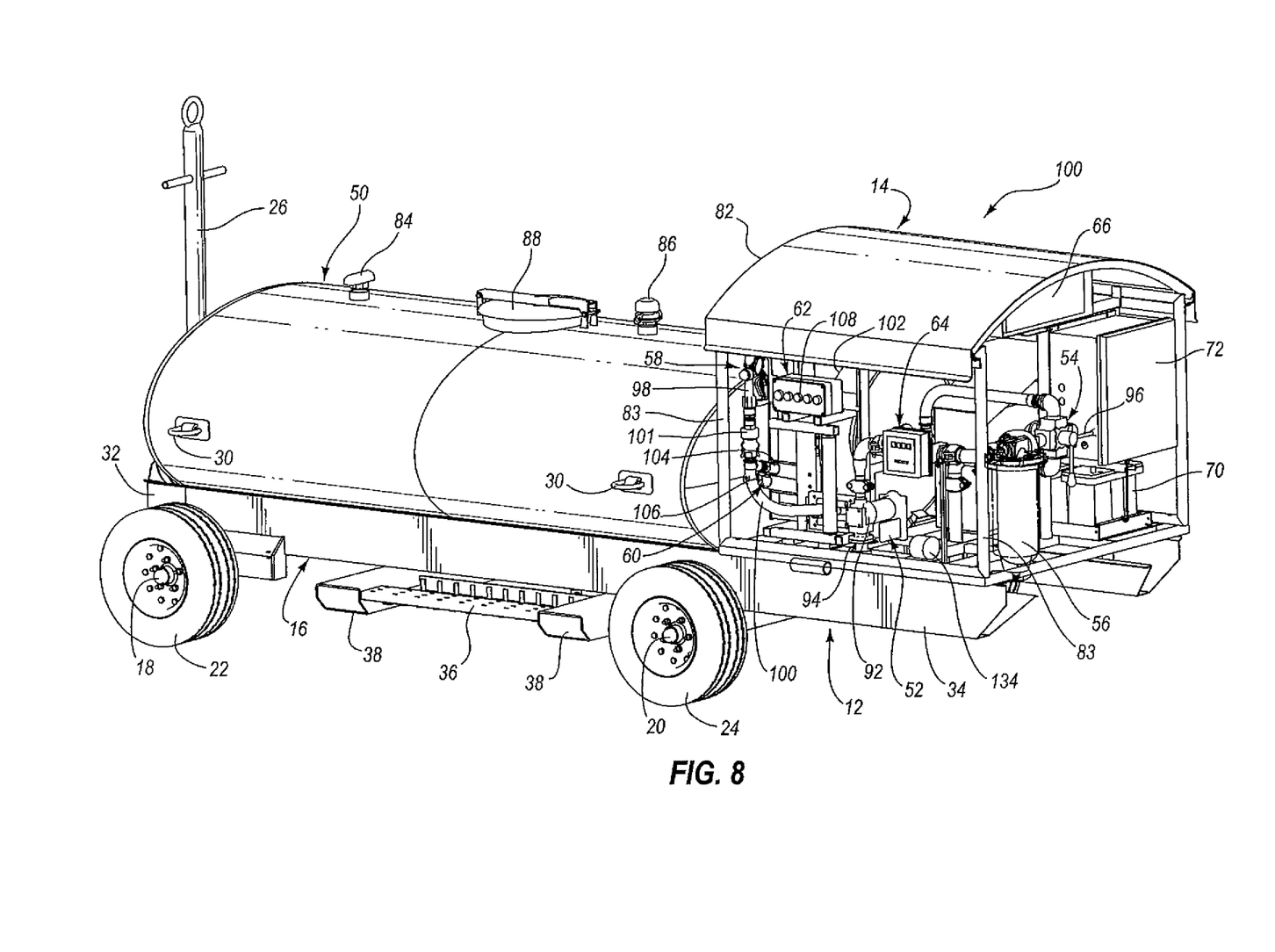
FIG. 8 is a top and rear perspective view of another example equipment service cart in accordance with the present disclosure.

The fuel dispenser assembly 58 may include a nozzle 98, a hose 100, and a hose spool 102 (see, for example, FIG. 8). The fuel reclaiming assembly 60 may include a suction wand 104 and a suction tube 106. The suction wand 104, suction tube 106, and nozzle 98 may include quick connect/disconnect features 101 (see FIGS. 2 and 8) to permit connection to the hose 100 in place of the nozzle 98. The hose 100 may be coupled in flow communication with the pump assembly 52 via, for example, the valve assembly 54. With different setting of the valve assembly 54, operation of the pump assembly 52 may provide dispensing or reclaiming fuel depending on what device is attached to the hose 100. In other arrangements, the fuel reclaiming assembly 60 may be separately coupled in fluid communication to the pump assembly 52 in an arrangement separate from using the hose 100 (i.e., using a different hose, pipe, or other conduit).

In some arrangements, a separate pump assembly 52 may be provided for each of the fuel dispensing assembly 58 and fuel reclaiming assembly 60. In such an arrangement, a valve assembly that includes a directional valve such as a two-way valve assembly or a four-way valve assembly for directing flow to and/or from the fuel tank 50.

At least one pressure relief valve 130 (see FIG. 6) may be positioned in at least one of the fuel lines of the service equipment assembly 14. The pressure relief valve may be operable to limit cavitation in the fuel during, for example, a dead head condition (i.e., idle condition) when the pump 92 is operating and no fuel is flowing through the fuel lines of the service equipment assembly 14.

The service equipment assembly 14 may further include a control console 62 and a fuel flow meter 64 that are associated with dispensing and reclaiming fuel via the assemblies 58, 60. The control console 62 may include a plurality of buttons or actuators 108 that assist the operator in controlling use of the pump assembly 52 and fuel reclaiming assembly 60. The actuators 108 may include, for example, ON/OFF actuators, gauges, and indicators.

The valve assembly 54 may include a manual actuator 96, although other types of actuators such as pneumatic or electronic actuators may be used to control the valve assembly 54. Features for controlling the valve assembly 54 may be consolidated at the control console 62 for easy operation by the operator rather than being positioned at other locations such as long the rear side of the service cart 10 at the valve assembly 54.

The fuel flow meter 64 may provide a visual indicator to the operator of the amount of fuel flow occurring to or from the fuel tank 50. The fuel flow meter 64 may provide visual indicators of flow rate as well as other conditions related to the fuel such as pressure, temperature, and density. In at least some arrangements, the fuel flow meter 62 may be integrated into the control console 62.

The service equipment assembly 14 may also include a spill containment kit 66, a fire suppressant assembly 68, at least one battery 70, a power control box or power assembly 72, and a container storage tray 74. The spill containment kit 66 may include, for example, a piece of fluid proof sheeting that can be used to collect inadvertent fluid spillage associated with, for example, filling a GSE/AGE with fuel, reclaiming fuel from the GSE/AGE, or collecting/dispensing other fluids related to the GSE/AGE. The spill containment kit may include other features such as towels, cleaning supplies, and protective clothing useful for cleaning up such fluids as, for example, motor oil, hydraulic oil, coolant, and fuel.

The fire suppressant assembly 68 may include a container or dispenser 110 mounted to a mounting rack 112. The container 110 may be in the form of, for example, a fire extinguisher. The mounting rack 112 may include releasable straps, brackets, or the like that permit a secured mounting and quick release of the fire extinguisher or other dispenser 110.

The batteries 70 may include a single battery or a pack of a plurality of batteries. The batteries 70 may be configured as rechargeable batteries. The batteries 70 may be positioned at the rear portion 32 of the support frame 16. In some examples, the batteries 70 are positioned on the service cart 10 at a remote location relative to the fuel dispenser assembly 58, fuel reclaiming assembly 60, and other features of the service equipment assembly 14 where flammable materials are exposed. In one example, the batteries 70 are positioned on the step feature 36 as shown in broken line in FIG. 3

The batteries 70 may provide a DC voltage supply for powering various features of the service equipment assembly 14. For example, the batteries 70 may supply the power for the pump assembly 52 and associated control console 62 and fuel flow meter 64. Power from the batteries 70 may be controlled at least in part by the power control box 72. The power control box 72 may include, for example, a battery charger 114 and power adaptor 116 (see FIG. 9). In at least some arrangements, the power control box 72 may include a receptacle for receiving AC power that can be converted to DC power, for example, to charge the batteries 70 and/or supply DC power to other components of the service equipment assembly 14. Other electronic equipment may be provided on the service equipment assembly 14 and stored in, for example, the power control box 72 for protection from the elements and for safety purposes. The batters 70 may be charged via, for example, the components in control box 72 using power supplied by the bobtail or tub used to move the service cart 10.

In other arrangements, the power for the service cart 10 is supplied at least in part by a renewable power sources such as, for example, a solar panel or wind turbine that is mounted to the service cart 10. The power generated by the renewable power source may be stored in, for example, a rechargeable battery. A renewable power source may be used in combination with or in addition to other power sources such as a battery pack, an AC power source attached to an electrical grid, or a power source from another vehicle such as the bobtail or tug used to transport the service cart 10.

The container storage tray 74 may define a receptacle in which at least one removable container 118 is stored. The container storage tray 74 may be configured to permit easy mounting and removal of the removable containers 118. At least some of the removable containers 118 may include a fluid, such as, for example, hydraulic oil, motor oil, or coolant. In other arrangements, the removable containers 118 may retain dry, or gel material such as, for example, sand or other fluid clean-up materials.

In some arrangements, the service equipment assembly 14 may include a plurality of permanently mounted storage containers in addition to the fuel tank 50. For example, one or more containers or tanks may be mounted to the cart assembly 12 for use in storing motor oil, hydraulic oil, refrigerant, coolant, or other fluid needed to service a GSE/AGE.

The service equipment assembly 14 may include a source of compressed air such as, for example, a compressed air tank 76. The compressed air tank 76 may be coupled in full communication with a compressed air dispenser 78 (see FIG. 7) that is wound about a hose and air hose spool 120. The compressed air retained in the compressed air tank 76 may be generated by, for example, a DC air compressor mounted to the equipment service cart 10. In some arrangements, the compressed air dispenser 78 may be connected directly to an air compressor to receive a direct supply of compressed air as it is generated by the source of compressed air stored in the tank 76.

The service equipment assembly 14 may further include a lighting system 80 that includes at least one light member. The lighting system 80 may be arranged and configured to provide a source of light in or around the equipment service cart 10. In some arrangements, at least some of the lighting system 80 is mounted to, for example, portions of a cover 82 or the support members 83 that support the cover member 82. The light system 80 may include, for example, a plurality of LEDS or other low voltage light members. In some arrangements, the lighting system 80 may include a flood light or other high voltage light member that helps illuminate not only portions of the equipment service cart 10 but also portions of the GSE/AGE being serviced by the equipment service cart 10.

The service equipment assembly 14 may also include a records carrier 81 (see FIG. 7) that retains record logs, instructions, manuals, and other written material or data associated with the equipment service cart 10 or GSE/AGE being serviced. The records carrier 81 may be conveniently positioned at a location on the service cart 10 that promotes easy access and protection from the elements under the cover 82. The records carrier 81 may include a container and a lid that is adjustable between opened and closed positions. In some arrangements, the records carrier 81 is oriented vertically, and in other arrangements oriented horizontally or at some other angled orientation. Typically, the records carrier 81 provides a waterproof storage area.

The cover 82 and supports 83 define an enclosure within which many components of the service equipment assembly 14 are positioned. In some arrangements, this enclosure includes a plurality of panels and doors that create an enclosed spaces where the components are positioned. The example enclosure shown in FIGS. 1-7 is open around its periphery and bottom side. The top portion of the enclosure is covered with the cover 82 to provide minimum protection from some environmental conditions such as sun, rain and snow. An enclosure with at least some permanent openings or open access points can provide added ventilation to permits escape of fumes that may be present with the service equipment assembly 14.

A plurality of mounting brackets 132 (see FIG. 7) may be included with the service equipment assembly 14 to provide mounting and dismounting relative to the cart assembly 12. The mounting brackets 132 may include quick connect/disconnect features to improve easy of mounting and dismounting relative to the cart assembly 12.

Figure 9:
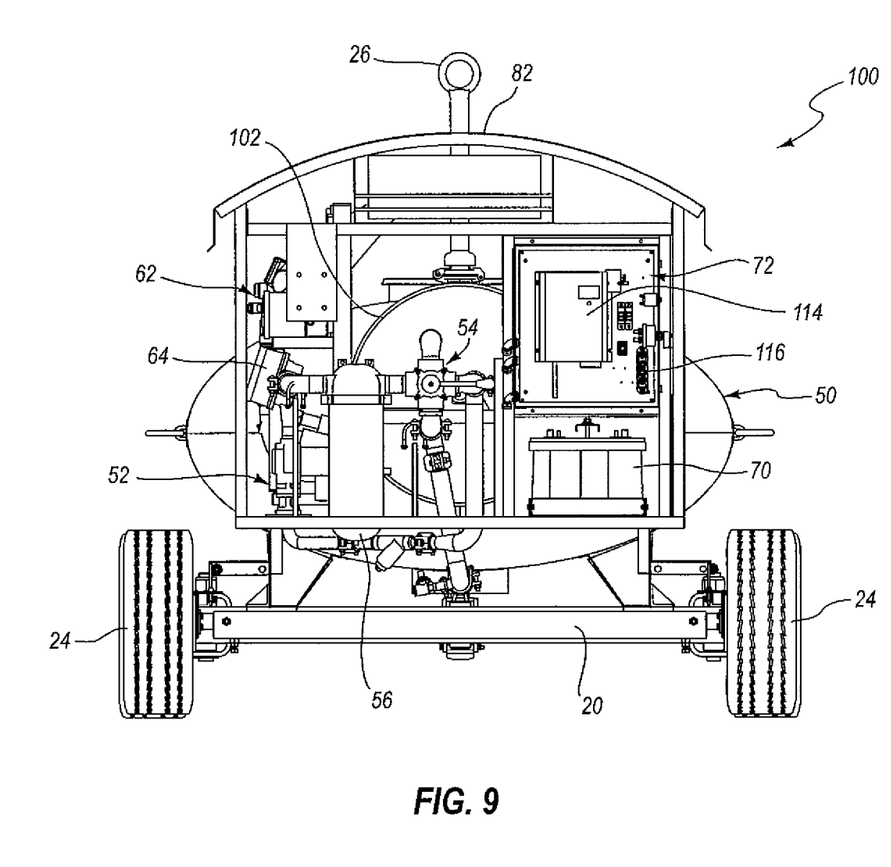
FIG. 9 is a rear view of the equipment service cart shown in FIG. 8.
Figure 10:
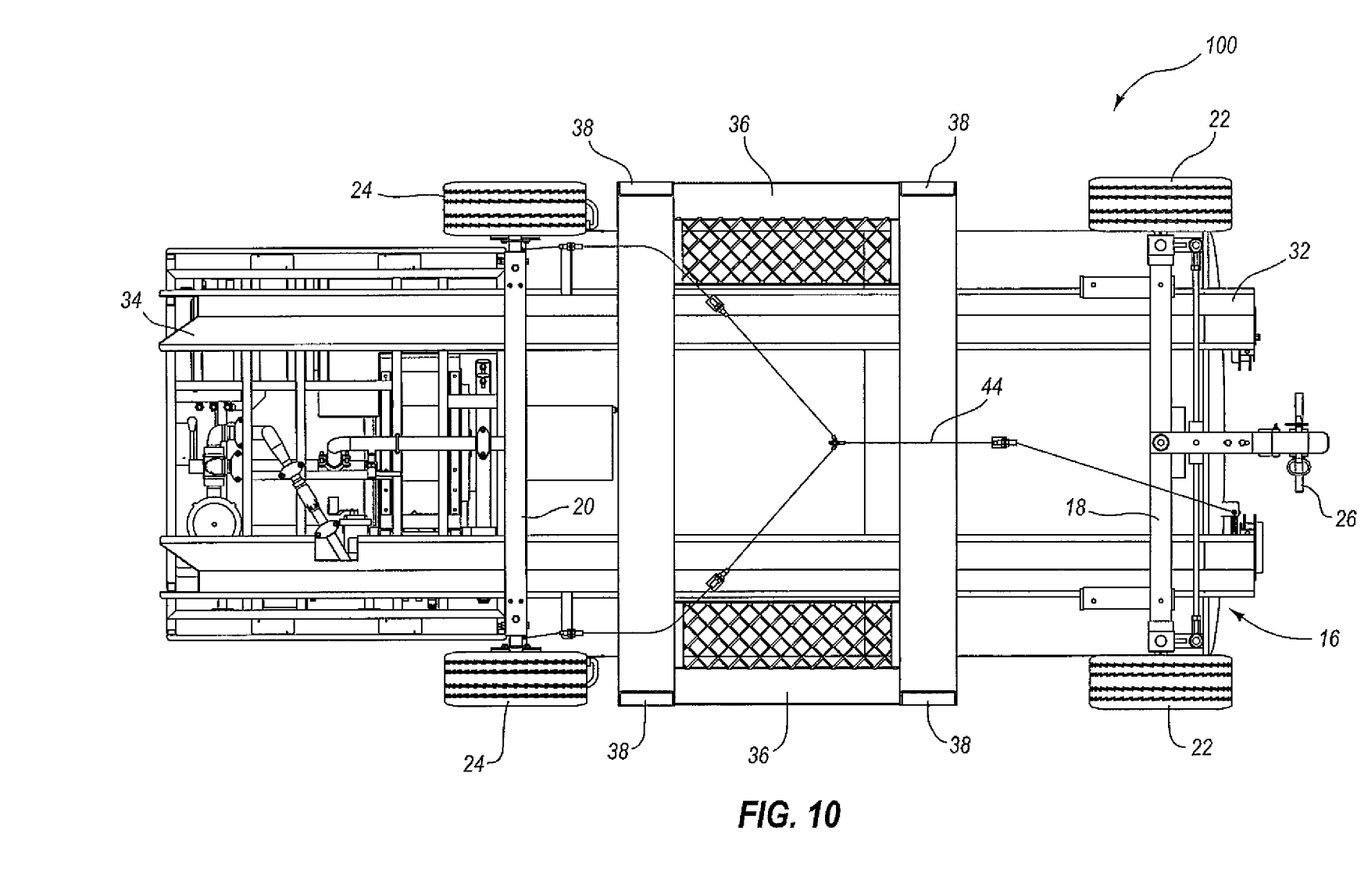
FIG. 10 is a bottom view of the equipment service cart shown in FIG. 8.

Referring now to FIGS. 8-10, another example equipment service cart 100 is shown and described. The equipment service cart 100 includes many of the same or similar features as described above with reference to the equipment service cart 10. The equipment service cart 100 further includes a pair of fork lift supports 38 associated with the support frame 16. The fork lift supports 38 may be constructed and arranged to permit insertion of one or more fork lift tines to facilitate a releasable connection between the fork lift and the equipment service cart 100 while lifting and transporting the equipment service cart 100 with a fork lift.

The equipment service cart 100 may further include a brake assembly that includes a cable 44 that extends across a bottom side of the equipment service cart 100 (see FIG. 10) rather than through, for example, the support frame 16.

A static ground/bonding reel 134 (see FIG. 8) may optionally be included with the service equipment assembly 14. The static ground/bonding reel 134 may help manage static electricity that is generated in or around the service cart 10.

The equipment service cart 10 may include additional or fewer features than those described above with reference to equipment service cart 10. For example, the equipment service cart 100 does not include the compressed air tank 76 and associated compressed air dispenser 78 and hose spool 120 shown in the embodiments of FIGS. 1-7. Further, the equipment service cart 100 may not include the fire suppressant assembly 68. A comparison of the equipment service carts 10, 100 exemplifies the variability that is possible in creating an equipment service cart that meets the needs of the types of GSE/AGE being serviced. The features of the service equipment assembly 14 may be rearranged relative to the cart assembly 12 to provide optimum efficiency and operability of the equipment service cart for its intended use.

At least some of the features of the service carts 10, 100 disclosed herein comprise wear resistant, corrosion resistant, durable materials such as, for example, stainless steel. In at least one arrangements, the exposed metal features of the service cart (e.g., the fuel tank 50, support frame 16, cover 82 and cover supports 83, housing for the power control box 72, container storage tray 74, compressed air tank 76, etc.) with exception of some typically non-metal components (e.g., controls, sealing members, hoses, battery housings, etc.) may comprise stainless steel or other material with similar properties that provide extended useful life for the service cart.

While the present disclosure has been described with reference to certain specific embodiments and examples, it will be recognized by those skilled in the art that many variations are possible without departing from the scope and spirit of the present disclosure. The inventive aspects of the present disclosure, as described at least in part by the claims, is intended to cover all changes and modifications which do not depart from the spirit of the present disclosure. The words "including" and "having," as used in the specification, including the claims, shall have the same meaning as the word "comprising."

The invention claimed is:

1. An equipment service cart, comprising:
   a support frame;
   at least two axles mounted to the support frame;
   at least one pair of wheels mounted to each axle;
   a tow bar connected at one end of the support frame and configured for attachment to a powered vehicle to tow the equipment service cart;
   a fuel tank;

a pump system configured to add fuel to and remove fuel from the fuel tank, the pump system including a fueling nozzle, a fueling hose, a defueling nozzle, and a defueling hose;

a fuel valve assembly operable to control fuel flow into and out of the fuel tank and including fuel valve controls;

a container storage portion configured to retain a plurality of removable fluid storage containers;

at least one DC power source;

a power control system operable to control power from the at least one DC power source as a sole source of power to operate at least the pump system and the fuel valve assembly;

wherein the container storage portion, the power control system, the fuel valve controls, and the fueling and defueling nozzles are consolidated at one end of the equipment service cart at a centralized control location;

said centralized control location being spaced rearward of the wheels for access by an operator at the centralized control location on the equipment service cart to provide efficiencies of time for the operator and to facilitate servicing activities by the operator in close proximity to the equipment being serviced using the equipment service cart.

2. The equipment service cart of claim 1, wherein the fuel valve assembly is operable to either permit fuel flow into or permit fuel flow out of the fuel tank at a given time.

3. The equipment service cart of claim 1, wherein the pump system includes at least one fuel filter member.

4. The equipment service cart of claim 1, wherein the container storage portion is configured to retain at least one removable storage container comprising one of motor oil, hydraulic oil, and engine coolant.

5. The equipment service cart of claim 1, wherein the at least one power source includes a rechargeable battery.

6. The equipment service cart of claim 1, further comprising a lighting system comprising at least one light member arranged to illuminate portions of the equipment service cart, wherein controls for the at least one light member are positioned at the control location on the equipment service cart.

7. The equipment service cart of claim 1, wherein the tow bar is adjustable between a lowered substantially horizontal operating position and a raised substantially vertical rest position.

8. The equipment service cart of claim 1, further comprising a brake system operable to apply a brake force to at least one of the pairs of wheels.

9. The equipment service cart of claim 1, further comprising a fuel dispensing assembly comprising the fueling hose and the fueling nozzle, the spool dispensing assembly being connected in flow communication with the fuel valve assembly.

10. The equipment service cart of claim 9, further comprising a spill containment kit.

11. The equipment service cart of claim 1, further comprising a source of fire suppressant.

12. The equipment service cart of claim 1, further comprising:

a source of compressed air;

a compressed air dispenser connected in flow communication with the source of compressed air;

wherein the compressed air dispenser is positioned at the control location on the equipment service cart.

13. The equipment service cart of claim 12, wherein the source of compressed air includes a compressed air storage tank.

14. The equipment service cart of claim 1, wherein the pump system, fuel valve assembly, container storage portion, and power control system are positioned outside of the at least two axles.

15. The equipment service cart of claim 1, wherein the pump system, fuel valve assembly, container storage portion, and power control system are positioned on the equipment service cart axially spaced apart from the fuel tank.

* * * * *